Patented Aug. 25, 1936

2,051,871

UNITED STATES PATENT OFFICE 2,051,871

TREATMENT OF MOTOR FUEL

Charles D. Lowry, Jr., Chicago, Ill., assignor to Universal Oil Products Company, Chicago, Ill., a corporation of Delaware No Drawing. Application April 30, 1934, Serial No. 723,180

9 Claims. (Cl. 44—9)

The invention relates more particularly to the treatment of motor fuel fractions produced in the cracking of petroleum.

In a more specific sense it is concerned with the use of small quantities of specific anti-oxidants or inhibitors to retard the deterioration in properties of cracked gasoline which are ordinarily suffered under average storage conditions prevailing in refineries. A further feature of the invention, which will be developed more in detail in the following specification, comprises the use of materials which indicate the partial or complete consumption of the inhibitor by a color change so that the extent of deterioration of the inhibited gasoline is readily determined at any period in its storage.

The art of using inhibitors to retard or substantially prevent deterioration in properties of cracked gasolines during their normal storage period prior to their sale is a relatively recent development in the petroleum refining art and the discovery of materials which are effective for this purpose has, to a large extent, eliminated the necessity for extensive chemical refining of petroleum distillates and at the same time conserved valuable material. In the older and more customary methods of treatment primary cracked naphthas were treated with a sulphuric acid of commercial strength, the sludge separated, the distillate neutralized and subjected to a carefully run steam distillation to produce an endpoint gasoline. Sulphuric acid is not entirely selective in its action upon the more highly unsaturated olefins and sulphur compounds and tends to either dissolve or polymerize some mono-olefins which are valuable as antiknock constituents when sufficient quantities of acid are used to effect a substantial sulphur reduction.

When raw or partly treated cracked gasolines are stored they frequently deteriorate in respect to color, gum content and antiknock value. The chemical reactions involved in these changes are evidently due to the polymerization of diolefins of a conjugated character to form gummy and resinous materials which ultimately precipitate and deposit in fuel feed lines and carburetors and on valve stems to seriously hinder the operation of internal combustion engines. The loss in antiknock value is probably due to actual lessening of gasoline boiling range material and also to the presence of peroxides of olefins in solution in the gasoline, which accelerate the reactions of combustion in the engine cylinder.

To overcome the tendency of cracked gasolines to lose their valuable properties on storage a large number of special chemical compounds and semi-refined products have been tried.

In one specific embodiment the present invention comprises the use of hydroxy phenyl azo alpha naphthols as inhibitors, dyes and indicators in unstable gasolines.

The preferred inhibiting materials, according to the concept of the present invention, are the ortho and para compounds, which are oil soluble dyes imparting a yellow to brown color to gasolines, depending upon the quantities used in solution. The following description is given of the manufacture of these compounds to assist in developing their chemical structure and their properties. It is believed that these compounds are in themselves novel, particularly the ortho compound, the details of the preparation of which were developed by me.

*p-Hydroxyphenylazo alpha naphthol*

In the preparation of this compounds 7 parts by weight of p-aminophenol is dissolved in 12½ parts of water and an equal volume of concentrated hydrochloric acid is added. This solution is cooled to approximately 5° C. and diazotized by adding a concentrated aqueous solution containing approximately 3.8 parts by weight of sodium nitrite. The completion of this primary reaction is indicated by using starch potassium iodide paper. After the diazo compound is formed 7.2 parts by weight of alpha naphthol is dissolved in 18 parts of a 10% sodium hydroxide solution and this solution is mixed with a separately prepared solution of 2.8 parts by weight of sodium carbonate in 40 parts of water. To this latter composite the preliminarily prepared diazonium solution, diluted to 50 volumes with water is rapidly added. The desired dye precipitates and may be used in the crude form, although an improved product can be obtained by re-dissolving the precipitate in organic solvents and subsequently recrystallizing.

*o-Hydroxyphenylazo alpha napthol*

The following details of operation have been observed to produce satisfactory yields of this compound. 10.9 parts by weight or o-aminophenol are dissolved in 100 parts of water, and 8 parts of concentrated hydrochloric acid are added to the solution. To manufacture the diazo compound a solution of 6.9 parts by weight of sodium nitrite in 35 volumes of water is added. The solution containing the diazo compound is then added to a solution of 14.5 parts by weight of alpha naphthol in 100 cc. volumes of ethyl alcohol and to this solution 40 volumes of 10% sodium hydroxide solution and 25 parts by weight of solid sodium carbonate are further added. The solution containing the reactants is allowed to stand for about two hours and an excess of acetic acid is added to precipitate the dye, which is then filtered and washed. This material can also be used without recrystallizing.

The two foregoing dyes give slightly different shades of color when used in unstable gasolines, although the primary shade of each may be described as a variety of bronze. They function to arrest the oxidation reactions which ordinarily start the deterioration of cracked gasolines by preferentially absorbing oxygen and in so doing becoming gradually consumed and decolorized. However, tests both in the oxygen bomb and in storage have shown that when proper quantities are used there is very little loss in color for a considerable period, so that gasolines in which they are used show a uniform tint for the ordinary periods of storage encountered in the course of the distribution of motor fuel. The exhaustion of the inhibitor is first evidenced by a lightening of color which quickly goes through a yellow stage and then disappears completely. The appearance of the yellow color is an indication that more inhibitor is needed.

The following tests were made using 0.01 per cent of the preferred inhibitor dyes in a Pennsylvania cracked gasoline which had an induction period of 90 minutes in the oxygen bomb:

| Dye | Color in gasoline solution | Induction period— min. in .01% |
| --- | --- | --- |
| p-hydroxy phenyl azo alpha naphthol. | Brown to yellow | 530 |
| o-hydroxy phenyl azo alpha napthyl. | Brown to yellow | 575 |

The above data shows that the two compounds are satisfactory as colorants, inhibitors and indicators in cracked gasoline, since the use of 0.01 per cent gave a pleasing color of sufficient intensity for commercial use and at the same time raised the induction period to a value considerably in excess of the 240 minutes which is quite generally accepted as indicating gasoline which is sufficiently stable under average refinery and distributing station storage conditions.

Both inhibitors are sufficiently soluble in the majority of cracked gasolines so that the use of auxiliary solvents to make concentrates which are added to the gasoline instead of the solid material is usually unnecessary, although this procedure may be resorted to if desired. From 0.002 to 2 percent more or less may be added.

The novelty and utility of the process of the present invention are obvious from a consideration of the preceding specification and limited instances of numerical data showing practical results, but neither is to be considered as unduly limiting its scope.

I claim as my invention:

1. A process for the treatment of cracked hydrocarbon oil of substantially motor fuel boiling range to retard deterioration of the same in respect to gum formation and antiknock value, which comprises adding thereto a hydroxyphenylazoalphanaphthol which imparts color to the hydrocarbon oil, characterized by loss in color of the hydrocarbon oil as deterioration progresses.

2. A process for the treatment of cracked hydrocarbon oil of substantially motor fuel boiling range to retard deterioration of the same in respect to gum formation and antiknock value, which comprises adding thereto an orthohydroxyphenylazoalphanaphthol, which imparts color to the hydrocarbon oil, the process being further characterized by loss in color of the hydrocarbon oil as deterioration progresses.

3. A process for the treatment of cracked hydrocarbon oil of substantially motor fuel boiling range to retard deterioration of the same in respect to gum formation and antiknock value, which comprises adding thereto a parahydroxyphenylazoalphanaphthol which imparts color to the hydrocarbon oil, the process being further characterized by loss in color of the hydrocarbon oil as deterioration progresses.

4. A process for the treatment of cracked hydrocarbon oil of substantially motor fuel boiling range to retard deterioration of the same in respect to gum formation and antiknock value, which comprises adding thereto a small amount of hydroxyphenylazoalphanaphthol which imparts color to the hydrocarbon oil, the process being further characterized by loss in color of the hydrocarbon oil as deterioration progresses.

5. A process for the treatment of cracked hydrocarbon oil of substantially motor fuel boiling range to retard deterioration of the same in respect to gum formation and antiknock value, which comprises adding to the said cracked hydrocarbon oil from 0.002 to 2 per cent of hydroxyphenylazoalphanaphthol which imparts color to the hydrocarbon oil, the process being further characterized by loss in color of the hydrocarbon oil as deterioration progresses.

6. A cracked hydrocarbon oil of substantially motor fuel boiling range containing a relatively small amount of hydroxyphenylazoalphanaphthol to retard deterioration of said oil in respect to gum formation and antiknock value.

7. A cracked hydrocarbon oil of substantially motor fuel boiling range containing from 0.002 to 2 per cent of hydroxyphenylazoalphanaphthol to retard deterioration of said oil in respect to gum formation and antiknock value.

8. A method of treating gasoline containing gum-forming constituents which comprises adding thereto a relatively small amount of a hydroxyphenylazoalphanaphthol.

9. Motor fuel comprising gasoline containing gum-forming constituents and a relatively small amount of a hydroxyphenylazoalphanaphthol.

CHARLES D. LOWRY, JR.